United States Patent
Boissac

(10) Patent No.: US 7,496,987 B2
(45) Date of Patent: Mar. 3, 2009

(54) METHOD FOR ADJUSTING THE ANGULAR TRAVEL OF A WIPER MECHANISM BY MODIFYING THE LENGTH OF A CRANK AND CRANK COMPRISING A DEFORMABLE SECTION

(75) Inventor: Jean-Paul Boissac, Châtellerault (FR)

(73) Assignee: Valeo Systemes d'Essuyage, La Verriere (FR)

( * ) Notice: Subject to any disclaimer, the term of this patent is extended or adjusted under 35 U.S.C. 154(b) by 946 days.

(21) Appl. No.: 10/502,253

(22) PCT Filed: Jan. 30, 2003

(86) PCT No.: PCT/EP03/00939

§ 371 (c)(1),
(2), (4) Date: Jul. 21, 2004

(87) PCT Pub. No.: WO03/066394

PCT Pub. Date: Aug. 14, 2003

(65) Prior Publication Data

US 2005/0144750 A1    Jul. 7, 2005

(30) Foreign Application Priority Data

Feb. 4, 2002    (FR) .................................. 02 01367

(51) Int. Cl.
*B60S 1/02*    (2006.01)
(52) U.S. Cl. ................ 15/250.3; 15/250.31; 15/250.21; 74/42

(58) Field of Classification Search ................ 15/250.3, 15/250.31, 250.27, 250.21; 74/42, 43, 490
See application file for complete search history.

(56) References Cited

U.S. PATENT DOCUMENTS

| 2,894,774 | A |   | 7/1959 | Dudash |          |
|-----------|---|---|--------|--------|----------|
| 5,093,952 | A | * | 3/1992 | Nakatsukasa et al. | 15/250.13 |
| 5,408,719 | A | * | 4/1995 | DeRees et al. | 15/250.23 |
| 6,684,448 | B2 | * | 2/2004 | Shih | 15/250.19 |
| 2005/0144750 | A1 | * | 7/2005 | Boissac | 15/250.3 |
| 2007/0033762 | A1 | * | 2/2007 | Boissac et al. | 15/250.3 |

FOREIGN PATENT DOCUMENTS

| DE | 26 47 510 A | 4/1978 |
| EP | 0 904 997 A | 3/1999 |

\* cited by examiner

*Primary Examiner*—Lee D Wilson
(74) *Attorney, Agent, or Firm*—Osha • Liang LLP

(57) ABSTRACT

The invention concerns a method for adjusting the angular travel of a motor vehicle wiper mechanism, comprising a connecting rod and a crank, wherein the crank includes a body which extends longitudinally in a substantially horizontal plane, which is articulated at one first end about a vertical axis (A), and which is articulated at a second end to the connecting rod, comprising a step which consists in adjusting the angular travel by modifying the distance between the first and the second articulated ends of the crank. The invention is characterized in that the adjusting step consists in modifying the length of a longitudinal section of the body of the crank.

6 Claims, 2 Drawing Sheets

METHOD FOR ADJUSTING THE ANGULAR TRAVEL OF A WIPER MECHANISM BY MODIFYING THE LENGTH OF A CRANK AND CRANK COMPRISING A DEFORMABLE SECTION

The invention proposes a method of adjusting the angular travel of a motor vehicle wiping mechanism, of the type comprising a link and a crank, of the type in which the crank comprises a body which extends longitudinally in a substantially horizontal plane, which is articulated at a first end about a vertical axis, which is articulated at a second end on the link, of the type comprising a step of adjusting the angular travel by modifying the distance between the first and second articulated ends of the crank.

Such articulations with link or links and crank or cranks are found for example in driving devices in which an electric motor, possibly associated with a gearbox, drives in alternating sweep at least one wiper fixed to a drive shaft which is mounted for rotation with respect to the vehicle.

By means of a link and crank mechanism, it is for example possible to convert a continuous rotary movement of the output shaft of the drive motor into an alternating rotary movement of the drive shaft of each wiper.

The geometry and kinematics of this mechanism, and in particular the length of the cranks, determine the angular travel of each wiper. By modifying this geometry, it is possible to obtain, from one and the same output movement of the motor output shaft, two different angular travels for each of the two wipers.

It is therefore clear that it is particularly important to be able to correctly control the geometry of the mechanism and in particular the length of the links and cranks which are articulated between them by means of swivel articulations, but also the positioning of the various elements with respect to each other.

However, from one mechanism to another, it may happen that scatterings arise in the various characteristic dimensions of the mechanism and that unsatisfactory angular travels of the wiper result therefrom.

Thus it has already been proposed, in particular in the document EP-A-0,904,997, to be able to "vary" the length of a crank of such a mechanism by adjusting the position of the swivel of the swivel articulation on this crank.

For this purpose, the swivel is fixed through an oblong hole, forming an adjustment aperture, and its length is determined by clamping on mounting, the length over time thus being linked to the reliability of the clamping system.

It has also been proposed in the document U.S. Pat. Nos. 5,619,886 and 5,070,572 to be able to adjust the position of the swivel by means of an intermediate adjustment piece which is able to move in an adjustable manner about a vertical axis. The swivel is mounted on this intermediate piece so that the axis of the swivel is off centre with respect to the vertical axis of the intermediate piece. Adjustment of the position of the swivel is thus obtained by modifying the angular position of the intermediate piece.

However, it became clear that the various devices proposed up to the present time were either too complex to produce or insufficiently reliable with regard to the maintenance over time of the exact position of the swivel on the crank in its oblong hole.

Thus the object of the invention is to propose a simple and reliable adjustment method which guarantees a precise position of the swivel over time despite the forces transmitted and the vibration suffered by the mechanism over time.

For this purpose, the invention proposes a method of the type described above, characterised in that the adjustment step consists of modifying the length of a longitudinal portion of the body of the crank.

According to other characteristics of the invention:
the adjustment step consists of permanently deforming at least part of the longitudinal portion of the crank body;
the adjustment step consists of reducing the length of the portion of the crank body by bringing together the articulated ends of the crank body in a longitudinal direction;
the adjustment step is performed after a step of mounting the wiper mechanism on a test bench.

The invention also proposes a crank belonging to a movement transmission linkage of a motor vehicle wiper mechanism, of the type comprising a body which extends longitudinally in a horizontal plane and which comprises a first longitudinal end articulated on a link of the linkage, and a second longitudinal end which is connected to a wiper arm and which is articulated about a vertical axis, of the type in which the distance between the two articulated ends of the crank is adjustable, characterised in that the body of the crank comprises at least one portion which is able to be deformed permanently in order to modify and adjust the distance between the two articulated ends of the crank.

According to other characteristics of the invention:
the said portion of the crank body comprises at least one oblong hole of general longitudinal orientation which delimits two opposite deformable longitudinal branches.

Other characteristics and advantages of the invention will emerge from a reading of the following detailed description, for an understanding of which reference will be made to the accompanying figures, amongst which:

Figure 2A:
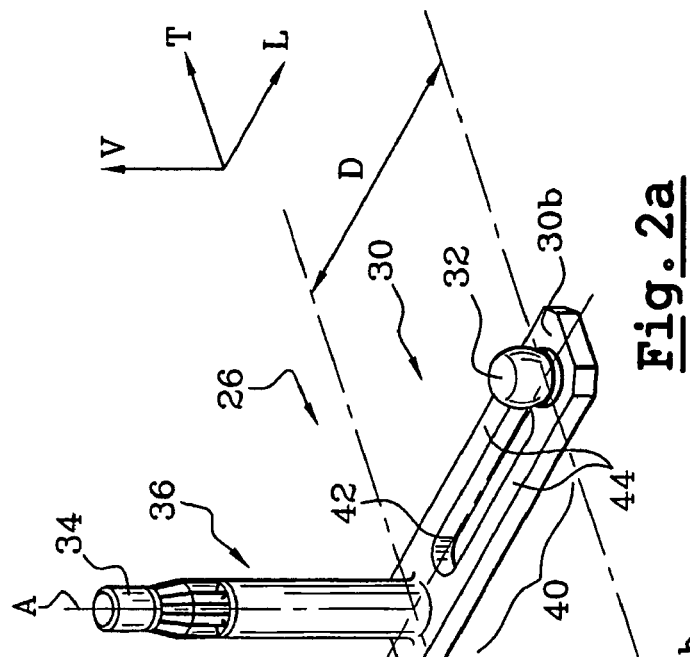
FIG. 2a is a schematic representation to a larger scale of a crank of the wiper mechanism depicted in FIG. 2a, in accordance with the invention and as it is before the adjustment of the angular travel according to the invention.

For the description of the invention, the orientations vertical, longitudinal and transverse will be adopted non-limitingly according to the reference frame V, L, T indicated in FIG. 2a.

In the following description, identical, similar or analogous elements will be designated by the same reference numbers.

Figure 1:
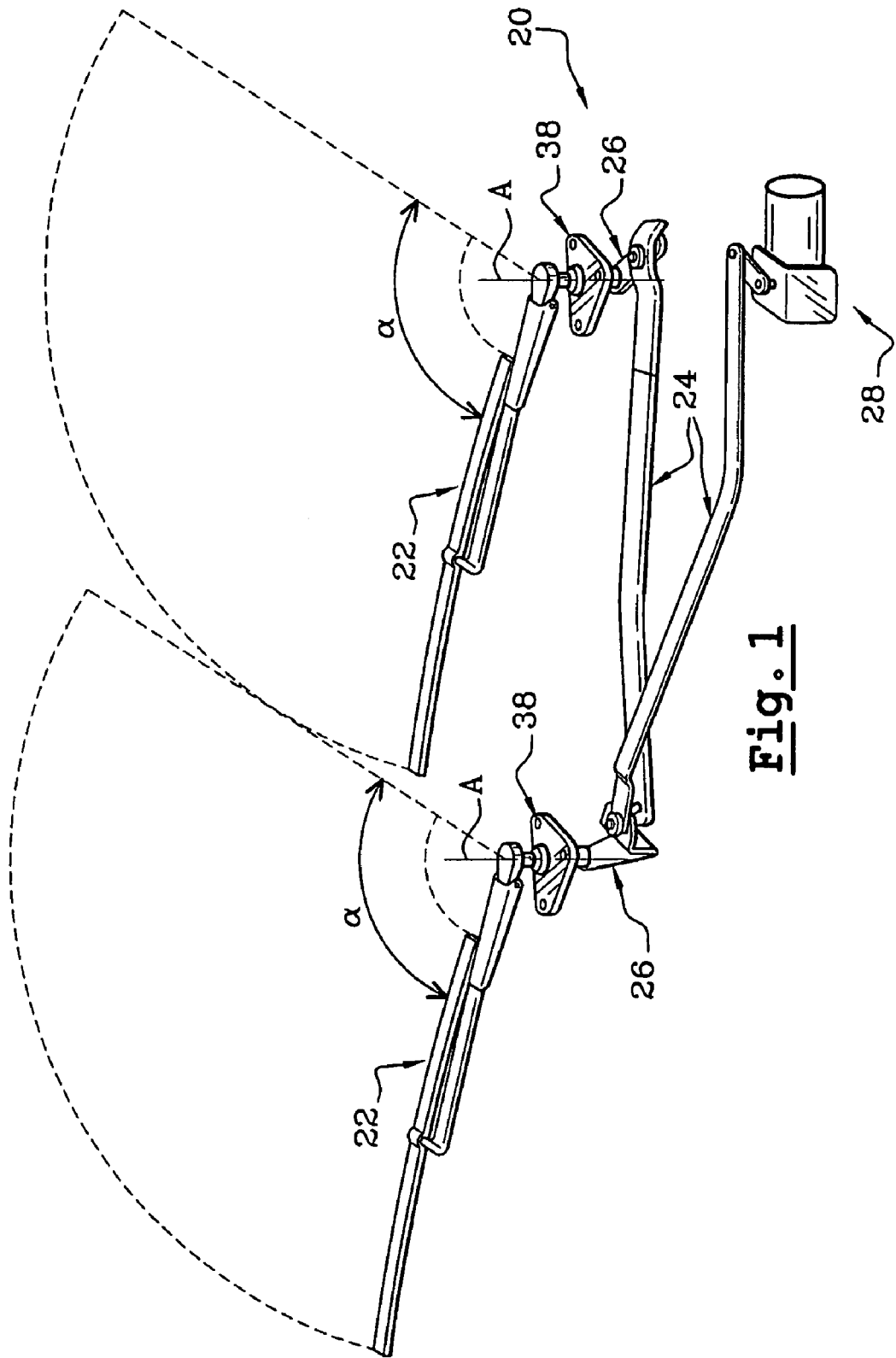
FIG. 1 is a schematic representation in perspective of a conventional wiper mechanism comprising a mechanism or linkage for driving and movement transmission of the link and crank type.

FIG. 1 depicts a conventional wiper mechanism 20 of a motor vehicle windscreen (not shown) which comprises two wiper blades 22. Each blade is able to move in rotation about a substantially vertical axis A. The wiper mechanism 20 comprises a linkage composed of links 24 and cranks 26 which connect the blades 22 to a geared motor unit 28 which drives the wiper mechanism 20.

Figure 2B:
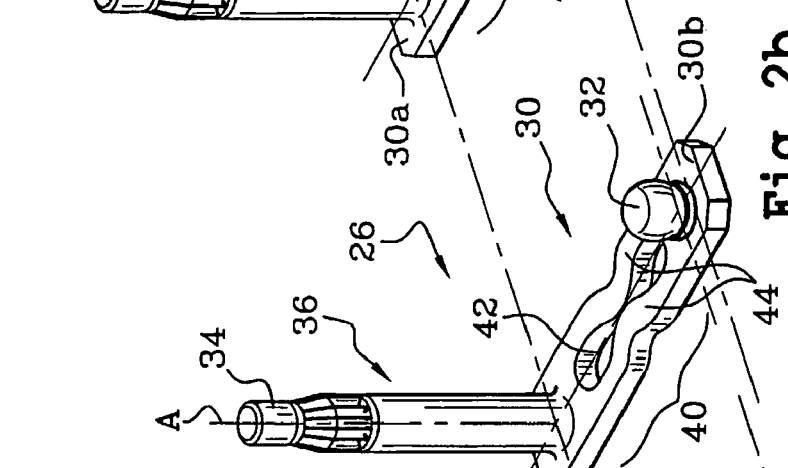
FIGS. 2b and 2c are views similar to that in FIG. 2a in which the crank is depicted after its deformation for adjusting the sweep angle.
Figure 2C:
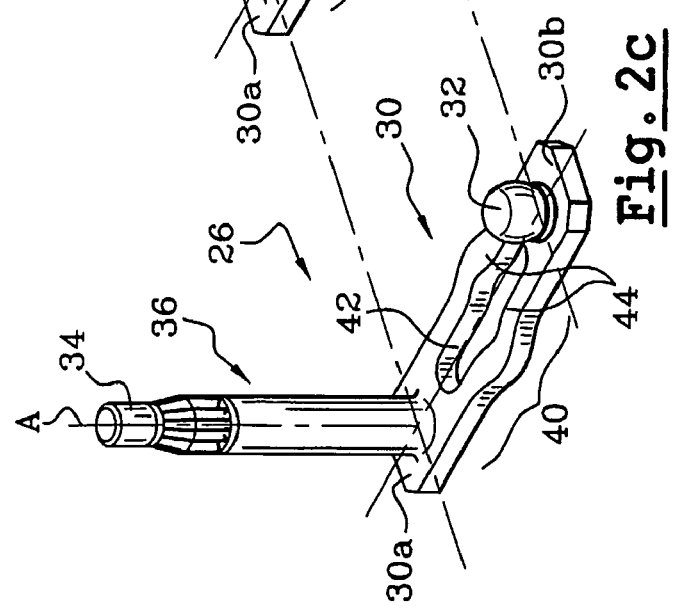

In a known manner, and as depicted in FIGS. 2a to 2c, each crank 26 comprises a roughly flat body 30 which extends longitudinally in a horizontal plane and which is articulated, at a first end 30a, about the vertical rotation axis of the associated blade 22.

The body 30 comprises, at its second free end 30b, an articulation swivel 32 for the crank 26 with a link 24.

Each wiper blade 22 is for example intended to be mounted at the top end 34 of a drive shaft 36 so as to be driven in an alternating rotary sweep movement about the axis A of the shaft 36. The shaft 36 is guided in a bearing body 38 (depicted in FIG. 1) which is intended to be arranged close to the window to be wiped, on the internal side of a bodywork element or vehicle structure (not shown) through which only the top end 34 of the shaft 36 projects.

In order to provide the rotational driving of the wiper blade 22 about its axis A, and as depicted in FIGS. 2a, 2b and 2c, the drive shaft 36 extends vertically upwards from the first end 30a of the body 30 of the crank 26.

In accordance with the teachings of the invention, and as depicted in FIG. 2a, the body 30 of the crank 26 comprises at least one portion 40 which is able to be deformed permanently so that it is possible to adjust the distance "D" between the two ends 30a, 30b of the body 30 of the crank 26, with a view to modifying the angular travel "α" of the blade 22.

For this purpose, the portion 40 of the body 30 preferably comprises a central oblong hole 42 of longitudinal orientation overall, which delimits two longitudinal branches 44. According to a preferred embodiment of the invention, the oblong hole 42 is positioned and sized so that the branches 44 are symmetrical with respect to the median longitudinal axis of the crank 26.

The dimensions of the oblong hole 42 and of the portion 40 are such that the longitudinal branches 44 can be deformed for adjusting the distance between the two ends 30a, 30b of the body 30 of the crank 26. However, they must not deform during the functioning of the wiper mechanism 20.

The invention also proposes a method of adjusting the angular travel "α" of each blade 22 of the wiper mechanism 20. For this purpose, the wiper mechanism 20 is first of all mounted on a test bench which makes it possible in particular to determine the differences between the angular travel "α" of each blade 22 and the actual angular travel "α". From these values, it is then possible to adjust the wiper mechanism in order to have an optimum angular travel "α".

The adjustment step is performed whilst the crank 26 is mounted on the wiper mechanism 20, which makes it possible to eliminate the steps of removal and then refitting of each crank 26, and therefore to reduce the time for mounting the wiper mechanism 20.

The angular travel "α" of the blade 22 depends on the dimensions of the links 34 and the cranks 30 of the linkage, as well as of the geared motor 36. However, only one modification of the dimensions of the crank 26 makes it possible to vary the angular travel "α" of the blade 22 independently of the other blade 22.

The angular travel "α" of the blade 22 depends on the length of the crank 26, and the variation in the angular travel "α" is inversely proportional to the variation in the length of the body of the crank. Thus, for example, a small angular travel "α" corresponds to a long crank length 26 and, conversely, a large angular travel "α" corresponds to a short crank length 26.

Thus, if the angular travel "α" of the blade 22 in question is too small, this means that the distance between the ends 30a, 30b and the body 20 of the associated crank 26 is too great.

To adjust the angular travel "α" of the blade 26, the adjustment method includes a step of adjusting the angular travel "α" of the blade 22 which consists of varying the length of the longitudinal portion 40 of the body 30 of the crank 26.

Since the portion 40 is able to be deformed because of the presence of the oblong hole 42, the adjustment of the angular travel "α" of the blade 22 consists of deforming the portion 40, that is to say the branches 44. Moreover, the branches 44 are deformed permanently so that the crank 26 next definitively keeps the adjustment for its normal functioning.

In order to increase the angular travel "α", the distance between the two ends 30a, 30b is reduced. For this purpose, and as depicted in FIGS. 2b and 2c, the branches 44 are deformed symmetrically with respect to the median longitudinal axis of the body 30 of the crank 26.

This deformation can consist of a bringing together of the branches 44, as depicted in FIG. 2b, or a separation of the branches 44, as depicted in FIG. 2c. In all cases, the deformation is performed by means of a tool adapted to the required deformation mode and to the nature of the body 30 of the crank 26.

The tool is for example in the form of a clamp, each jaw of which cooperates with a branch 44 of the crank 26 in order to separate it from or bring it closer to the other branch 44. In addition, in order to avoid creating a stress concentration zone at the deformation produced by the jaws of the tool, the latter preferably have a rounded shape.

The deformation consists of deforming the branches 44, but not modifying the length thereof. As a result the ends 30a, 30b of the body 30 of the crank 26 are overall brought together longitudinally.

The deformation of the portion 40 can consist, as depicted in FIG. 2b, of bringing together at least part of the branches 44 so that they occupy a part of the volume of the defined by the oblong hole 42. The body 30 of the crank 26 then occupies a reduced volume. However, the amplitude of adjustment of the angular travel "α" is limited by the volume defined by the oblong hole 42.

The deformation of the portion 40 can thus consist, as depicted in FIG. 2c, of separating transversely and at least partly the branches 44 which then extend transversely beyond the original external longitudinal edge of the body, whose transverse dimension is thereby increased. However, the amplitude of adjustment of the angular travel "α" is greater than the amplitude of the adjustment consisting of bringing together the branches 44, and this amplitude is limited to the length of the oblong hole 42.

By way of variant of the invention, the length of the body of the crank can be increased by applying the method described above. For this purpose, in its initial state, that is to say before its deformation, the crank 26 is in the form depicted in FIG. 2c in which the branches 44 are partly separated.

Thus, in order to increase the length of the body 30 of the crank 26 and therefore to reduce the angular travel "α" of the blade 22, the branches 44 are straightened according to the modification to be obtained. The maximum length of the body 30 is obtained when the branches are rectilinear, as depicted in FIG. 2a.

When the crank 26 is in its initial state, the branches 44 are not separated to the maximum extent so that it is possible to separate them further in order to be able to reduce the length of the body 30 of the crank 26.

By way of variant, not shown, the deformation of the branches 44 can consist of an identical curvature of the two branches 44, which then extend parallel with respect to each other.

One advantage stemming from the fact that the two ends 30a, 30b of the body 30 of the crank 26 are brought together longitudinally, is that the modification of the angular travel "α" is symmetrical with respect to its bisecting line. Thus the adjustment of the angular position of the arm 22 with respect to the drive shaft 26 is independent of the adjustment of the angular travel "α", each of these adjustment steps being able thus to be performed without modifying the adjustment obtained during the other step.

Such an adjustment step makes it possible to have immediate adjustment of the angular travel "α" of each blade 22, without having to remove and then refit any element of the wiper mechanism 20. This makes it possible to eliminate any differences in adjustment due to a relative movement of the two pieces during refitting.

The invention claimed is:

1. A method of adjusting the angular travel of a motor vehicle wiping mechanism, wherein the wiping mechanism comprises a link and a crank, wherein the crank comprises a body which extends longitudinally in a substantially horizontal plane, which is articulated at a first end about a vertical axis and at a second end on the link, wherein the method comprises a step of adjusting the angular travel by modifying the distance between the first and second articulated ends of the crank, wherein the adjustment step consists of modifying the length of a longitudinal portion of the body of the crank, and wherein a portion of the body of the crank comprises at least one oblong hole of longitudinal orientation overall, which delimits two opposite deformable longitudinal branches.

2. The method according to claim 1, wherein the adjustment step consists of permanently deforming at least part of the longitudinal portion of the body of the crank.

3. The method according to any claim 1, wherein the adjustment step consists of reducing the length of the portion of the body of the crank by bringing together the articulated ends of the body of the crank in a longitudinal direction.

4. The method according to claim 1, wherein the adjustment step is performed after a step of mounting the wiper mechanism on a test bench.

5. A crank belonging to a movement transmission linkage of a motor vehicle wiper mechanism, wherein the wiper mechanism comprises:

a body which extends longitudinally in a horizontal plane and which comprises a first longitudinal end articulated on a link of the linkage, and a second longitudinal end which is connected to a wiper arm and which is articulated about a vertical axis, wherein the distance between the two articulated ends of the crank is adjustable, wherein the body of the crank comprises at least one portion which is able to be deformed permanently in order to modify and adjust the distance between the two articulated ends of the crank, and wherein a portion of the body of the crank comprises at least one oblong hole of longitudinal orientation overall, which delimits two opposite deformable longitudinal branches.

6. The crank according to claim 5, wherein the branches of the crank are roughly symmetrical with respect to a median longitudinal axis of the crank.

* * * * *